United States Patent
Lee et al.

(10) Patent No.: US 8,208,855 B2
(45) Date of Patent: Jun. 26, 2012

(54) METHOD FOR TRANSITION BETWEEN DISTRIBUTED TRANSMISSION AND LOCALIZED TRANSMISSION

(75) Inventors: Ju-Ho Lee, Suwon-si (KR); Xiaoqiang Li, Beijing (CN); Chengjun Sun, Beijing (CN); Chunying Sun, Beijing (CN); Yujian Zhang, Beijing (CN)

(73) Assignees: Samsung Electronics Co., Ltd (KR); Beijing Samsung Telecom R&D Center (CN)

( * ) Notice: Subject to any disclaimer, the term of this patent is extended or adjusted under 35 U.S.C. 154(b) by 828 days.

(21) Appl. No.: 12/160,182

(22) PCT Filed: Jan. 8, 2007

(86) PCT No.: PCT/KR2007/000107
§ 371 (c)(1),
(2), (4) Date: Jan. 21, 2009

(87) PCT Pub. No.: WO2007/078178
PCT Pub. Date: Jul. 12, 2007

(65) Prior Publication Data
US 2009/0130985 A1    May 21, 2009

(30) Foreign Application Priority Data
Jan. 6, 2006    (CN) .......................... 2006 1 0005298

(51) Int. Cl.
*H04B 17/00* (2006.01)
(52) U.S. Cl. ...................... 455/63.1; 455/65; 455/67.11
(58) Field of Classification Search .................. 455/63.1, 455/65, 67.11
See application file for complete search history.

(56) References Cited

U.S. PATENT DOCUMENTS
| | | |
|---|---|---|
| 2005/0201295 A1 | 9/2005 | Kim et al. |
| 2005/0238108 A1 | 10/2005 | Suh et al. |
| 2005/0289256 A1* | 12/2005 | Cudak et al. ............... 710/62 |
| 2006/0120470 A1 | 6/2006 | Hwang et al. |

FOREIGN PATENT DOCUMENTS
| | | |
|---|---|---|
| KR | 2005/91582 | 9/2005 |
| KR | 2005/109009 | 11/2005 |

OTHER PUBLICATIONS

Int'l Search Report (PCT/ISA/210) (6 pp), Feb. 26, 2007.
Written Opinion of Int'l Search Authority (PCT/ISA/237) (3 pp), Feb. 26, 2007.

* cited by examiner

*Primary Examiner* — Yuwen Pan
(74) *Attorney, Agent, or Firm* — The Farrell Law Firm, P.C.

(57) ABSTRACT

Provided is a method for transitioning between a distributed transmission mode and a localized transmission mode, including transmitting, by a Base Station (BS), a measurement control message to a User Element (UE), wherein the UE makes corresponding measurement and transmits a required measurement report message to the BS and the BS transmits a transition indicator message of new mode to the UE based on measurement report message sent from the UE; and commencing CQI reporting and a downlink transmission of a new mode between the UE and the BS. The BS can choose a more appropriate transmission mode for the downlink transmission based on changing characteristics of the channel in the time domain and the frequency domain.

8 Claims, 8 Drawing Sheets

METHOD FOR TRANSITION BETWEEN DISTRIBUTED TRANSMISSION AND LOCALIZED TRANSMISSION

PRIORITY

This application claims priority to Chinese Patent Application Serial Number 200610005298.0, which was filed on Jan. 6, 2006, and to PCT application number PCT/KR2007/000107, which was filed on Jan. 8, 2007, the entire disclosure of each of which is incorporated herein by reference.

FIELD OF THE INVENTION

The present invention relates to a radio communication system with a localized data transmission mode and a distributed data transmission mode, and in particular, to the transition between the two transmission modes.

DESCRIPTION OF THE PRIOR ART

Now, the $3^{rd}$ Generation Mobile Communication System Partnership Project (3GPP) standardization organization has commenced on a Long-term Evolution (LTE) project to update existing system criteria. Among numerous physical layer transmission techniques, OFDM (Orthogonal Frequency Division Multiplexing) becomes a challenging all-in-one downlink solution, for OFDM bears such advantages as higher spectrum efficiency and lower processing complexity.

OFDM is a type of multi-carrier modulation communication technique. OFDM's basic principle is to divide a high-rate data stream into multiple low-rate data streams simultaneously transmitted via a group of orthogonal sub-carriers. Due to the nature of multi-carrier transmission, the OFDM technique bears superior performance in many aspects: (1) A remarkable superiority of the OFDM technique lies in that: inter-symbol interference (ISI) can be completely eliminated in the case that the channel delay is less than the length of Cyclic Prefix (CP), which is introduced in by adding guard spacing to each symbol, since data is transmitted, in parallel, through multiple sub-carriers and the length of symbol in each sub-carrier is correspondingly increased without sensitivity to channel delay. In this way, every sub-carrier experiences a flat fading channel. (2) The OFDM technique bears a high spectrum utility factor. In the frequency domain, OFDM signals actually overlap. This kind of overlap improves the spectrum utility factor to a great extent. (3) The OFDM technique has a strong capability in anti-narrowband interference or resisting frequency selective fading. Through channel coding and interleaving, the frequency diversity effect and the time diversity effect can be achieved in OFDM so that either narrowband interference or frequency selective fading can be effectively resisted. (4) In the OFDM technique, the modulation can be realized through the base-band Inverse Fast Fourier Transformation (IFFT), while IFFT/Fast Fourier Transformation (FFT) bears available fast calculation methods and can be conveniently implemented in a Digital Signal Processor (DSP) chip and hardware structure.

There are two transmission modes in an OFDM radio transmission system: a localized transmission mode and a distributed transmission mode.

In localized data transmission, the data is transmitted in sequential sub-carriers of the localized sub-band, and the network end will specify effective modulation coding method for the network's data transmission to realize adaptive modulation coding based on channel quality between the BS and the UE, thus increasing data transmission throughput. In a distributed transmission mode, the UE uses comb-like sub-carriers to transmit over the whole frequency band and causing the sub-carriers that transmit data to be distributed in the whole frequency band as much as possible, thus maximizing frequency diversity gain. Usually, the localized data transmission mode, which can use adaptive modulation coding and frequency scheduling, has a greater transmission gain, but to some channels having a fast-changing speed, channel conditions predicted at a particular time cannot reflect channel conditions of the next time. Therefore, localized transmission is hard to implement. Therefore, the distributed data transmission mode is often adopted for data transmission with the help of the frequency diversity gain.

During the process of downlink data's transmission:

In the case of a localized transmission mode, a User Equipment (UE) will measure the channel quality for each sub-band in the system frequency band, then the UE reports the measured Channel Quality Indicator (CQI) of each sub-band to the Base Station (BS). Having received the CQIs, the BS determines whether to allocate frequency resources to the UE, and determines which localized frequency bands to allocate to UE for data transmission, according to the reported CQI from each UE and the system current load. During the process of data transmission, a UE must measure the channel quality for each sub-band in the system frequency band and transmit the measured CQI to the base station so as to achieve the goals of frequency scheduling and Adaptive Modulation Coding (AMC) for data transmission. In this way, maximum throughput of data transmission can be reached.

In the case of the distributed transmission mode, a UE will measure the mean channel quality of the entire system frequency band, then report the unique mean CQI to the Base Station (BS). Having received this mean CQI, BS determines whether to allocate distributed frequency resource to the UE or not according to the reported CQI from each UE and the system current load. And during the process of data transmission, it is also necessary for a UE to go on to measure the mean CQI of the entire system frequency band and transmit the measured CQI to the base station so as to achieve the goals of frequency scheduling and AMC for data transmission. In this way, maximum throughput of data transmission can be reached.

From the descriptions above, it's seen that in localized transmission mode, the contents of the measurement report sent to BS from UE are sub-bands' CQIs, and in distributed transmission mode, a UE only sends the average CQI to BS. Therefore, the number of bits necessary to transmit the CQI information in localized transmission mode is far greater than that the number of bits necessary in the distributed transmission mode.

In the LTE system, the system will choose an appropriate transmission mode for data transmission between the BS and the UE based on the channel condition between the BS and the UE. When the channel condition between the BS and the UE changes, the transition between localized transmission and distributed transmission will probably happen.

There is a transition between the two transmission modes in existing Institute of Electronics and Electrical Engineers (IEEE) 802.16E radio transmission technology. Thereinto, signaling flowchart of the process of transition from distributed transmission to localized transmission is shown in FIG. 1. The implementation steps are:

The UE checks the maximum value of standard deviation in time domain of Signal-to-Noise-Ratios (SNRs) measured in all the sub-carriers, if the maximum value remains lower than an appointed threshold for a period of time and the mean SNR of the whole frequency band is larger than an appointed threshold, then the UE transmits a transition indicator 101 from distributed transmission mode to localized transmission mode to the BS. After the BS has received the transition indicator, it will transmit a channel measurement REPort REQuest (REP-REQ) 102 to the UE. After the UE has received the measurement report request, it will transmit a channel measurement REPort ReSPonse (REP-RSP) 103 to the BS. The REP-RSP message contains a channel quality indicator of the five sub-frequency bands having best channel quality. From the beginning of next frame after transmitting REP-RSP message, the UE will transmit a time domain difference CQI report of the chosen frequency bands 104 to the BS. Afterwards, the BS will transmit a localized channel allocation 105 to the UE based on CQI reported by the UE, and then transmit a localized data transmission 106 to the UE.

A signaling flowchart illustrating a process of transitioning from a localized transmission mode to a distributed transmission mode, shown in FIG. 2, includes the following steps:

The UE checks the maximum value of the standard deviation, in the time domain, of SNRs measured in all the sub-carriers. If the maximum value is higher than an appointed threshold for a period of time, then the UE will transmit to the BS, at 201, a transition indicator from a localized transmission mode to a distributed transmission mode. Then the UE will transmit to the BS, at 202, a mean CQI report of the whole frequency band. Afterwards, the UE will repeatedly transmit, at 201, a transition indicator from the localized transmission mode to the distributed transmission mode, and, at 202, the mean CQI report of the whole frequency band, until the BS transmits to the UE, at 203, distributed channel allocation. Afterwards the BS will transmit to the UE, at 204, distributed data transmission.

It can be seen, from the IEEE 802.16E data transmission mode transition process method, that if the maximum value of the standard deviation of SNRs measured in all sub-frequency bands in the time domain is comparatively large, then distributed transmission is suitable for the UE, and if the maximum value of the standard deviation of SNRs measured in all sub-frequency bands in the time domain is comparatively small and the mean SNR of the whole frequency band is larger than an appointed threshold, then the localized transmission mode is the suitable transmission mode for the UE. As a UE moving at a high speed has a time domain channel variation with a comparatively large variance, and a UE moving at a low speed has a time domain channel variation with a comparatively small variance. According to the IEEE802.16E specification, distributed data transmission is suitable for UEs moving at a high speed, and for US moving at a low speed, if the mean SNR of the UE's whole frequency band is high, then localized data transmission is suitable for the UE.

Regarding the localized transmission mode, as more uplink signaling is needed to transmit several sub-bands' Channel Quality Indicators (CQIs), the corresponding uplink signaling load is heavy. However, during data transmission in flat fading channel conditions, localized data transmission cannot acquire much selective frequency gain compared to distributed data transmission, because SNRs of all sub-carriers are basically the same, regardless of whether they are localized data transmission carriers or distributed data transmission carriers. Thus the adaptive modulation coding gains of the local data transmissions are basically the regardless of whether they use distributed transmissions or localized transmissions. But the localized transmission needs a CQI report of uplink multi-bands, thus introducing a heavier signaling load compared to the distributed transmission. It can be seen that for flat fading channel, even the UE moves at a low speed and the mean SNR is comparatively high, a distributed data transmission can still acquire the same selective frequency gain as that the selective frequency gain of a localized data transmission, and the data transmission's uplink signaling load is small. Thus, the distributed data transmission mode is more suitable.

Besides, the standardized method of the 3GPP is defined such that the network controls the transmission method of the UE, instead of the UE deciding the transition of the data transmission mode. Therefore the mode transition in IEEE 802.16E is not suitable for data transmission mode transition in the 3GPP LTE.

Therefore mode transition method in IEEE 802.16E can be improved, allowing the UE to use a more suitable transmission mode to transmit data.

In order to optimize the above-mentioned process of mode transition, some new measurement reports and measurement report processes must be defined. These measurement controls and reports can be transmitted through Radio Resource Control (RRC) signaling and physical layer signaling.

There are physical layer interfaces and interfaces to control radio resources between the UE and the BS, such as the RRC protocol defined in the 3GPP. The BS configures network resources used by the UE through the interface protocol, and controls the UE's functions, such as measurement, handover, etc. The physical layer interface between the UE and the BS is mainly responsible for physical signal exchanges, such as CQI reports of an existing system. CQI report is implemented through a channel structure defined by a given physical channel, such as the channel structure defined in 3GPP Technical Specification (TS) 25.211, or a channel structure defined elsewhere.

SUMMARY OF THE INVENTION

In order to resolve at least the above-mentioned problems, the present invention provides a data transmission mode transition method, where a Base Station (BS) can instruct a User Element (UE) to transmit a needed measurement report based on channel conditions of the data transmission, and notify the UE of the UE's transmission mode based on this measurement report.

In order to achieve the above goal, a method of transitioning between a distributed transmission mode and a localized transmission mode according to the present invention includes transmitting, by the BS measurement control message to the UE; making, by the UE, a corresponding measurement and transmitting a required measurement report message to the BS;

transmitting, by the BS, a transition indicator message of a new mode to the UE based on the measurement report message sent from the UE;

commencing CQI report and downlink transmission of new mode between the UE and the BS.

The BS of the present invention can choose more appropriate transmission modes for downlink transmission based on changing characteristics of the channel in the time domain and the frequency domain. When choosing a transmission mode, the BS also considers changing characteristics of the frequency domain, whereas, according to the traditional method, the transmission mode is selected only according to changing characteristics of the time domain. The method according to the present invention allows downlink transmissions to use distributed transmissions under a channel condition similar to flat fading, thus reducing uplink signaling overhead without reducing transmission gain.

DETAILED DESCRIPTION OF EXEMPLARY EMBODIMENTS

Hereinafter, preferred embodiments of the present invention will be described with reference to the accompanying drawings. In the following description, a detailed description of known functions and configurations will be omitted when it may make the subject matter of the present invention rather unclear.

Figure 1:
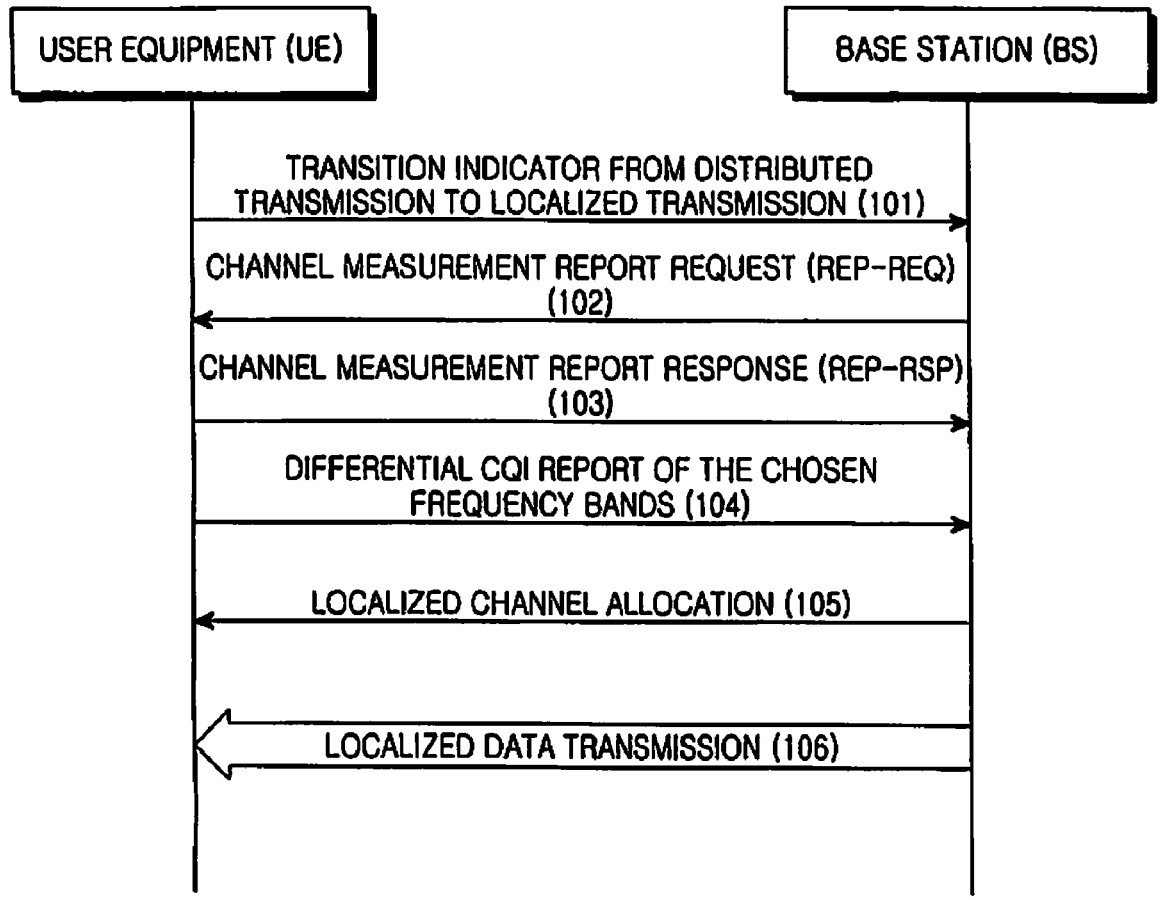
FIG. 1 is a signaling flowchart of a process of transitioning from a distributed transmission to a localized transmission in IEEE802.16E.
Figure 2:
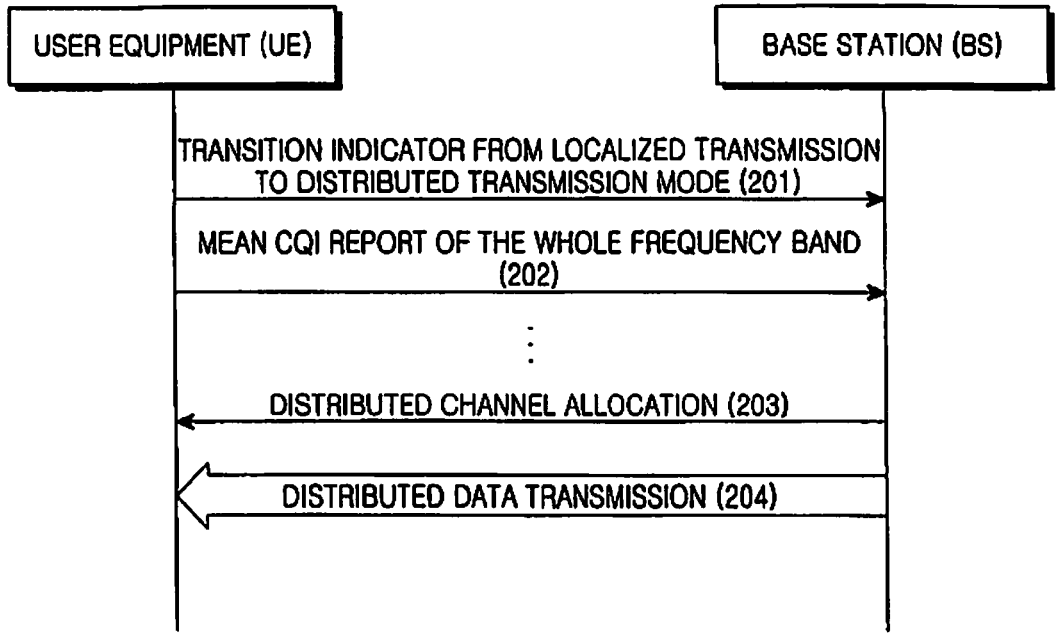
FIG. 2 is a signaling flowchart of a process of transitioning from a localized transmission to a distributed transmission in IEEE802.16E.
Figure 3:
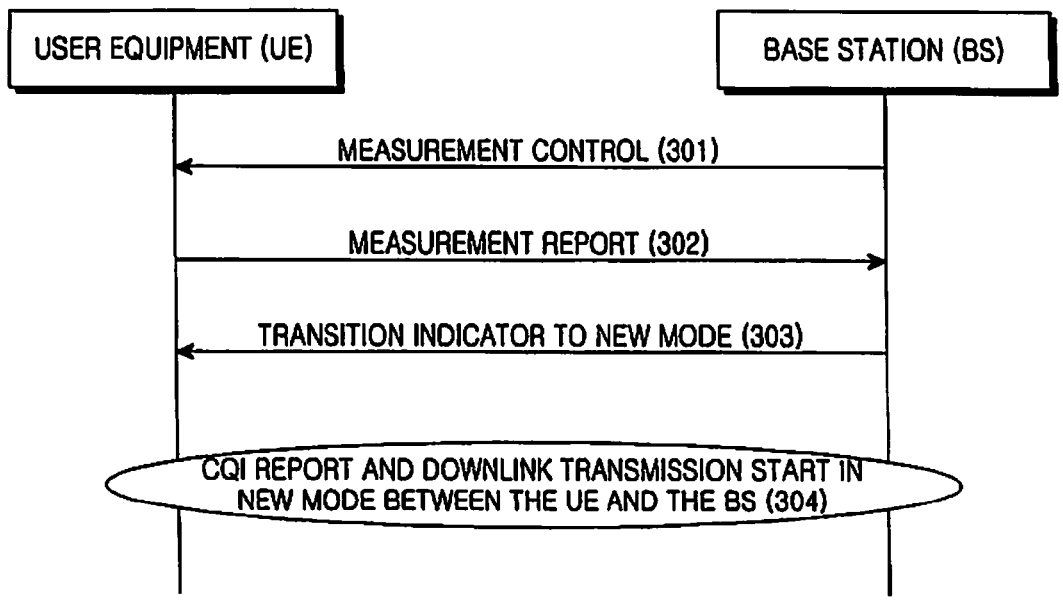
FIG. 3 is a signaling flowchart of a process of transitioning between a distributed transmission and a localized transmission according to present invention.

The present invention gives the transition method between localized data transmission and distributed data transmission in downlink transmission, signaling flowchart of process of transition implemented in the method is shown in FIG. 3, the process includes following steps:

The BS can determine whether the UE has converted the UE's transmission mode according to UE's service type information and the BS's information, such as measurement. When the BS determines that some measured information reported by the UE should be used to determine a transmission mode transition, then the measurement to be performed by the UE could be configured. Then, a radio resource control signaling measurement control message 301 can be transmitted to the UE, which includes the measurement to be taken by the UE (such as a measured value of selectivity in the frequency domain to reflect downlink channel fading) and a measurement report condition. When the BS indicates the measurement report condition, the BS can indicate a measurement report threshold to the UE, and the BS can also indicate a period of the UE reporting measurement report. After the UE has received the message, the UE measures, according to the indicator, specific measurement differs according to the measurement type. When the UE's measurement satisfies the BS's report condition, the UE will transmit a measurement report message 302 to the BS, which can contain a specific measured value, an event type measurement report, or other information. When the measurement report is an event-type report, a feasible method is that the UE reports the event to the BS when the measured value of the event is higher or lower than some threshold. Based on the measured value or measured event reported from the UE, the BS can decide UE's action in detail and transmit a new mode transition indicator 303 to the UE, instructing the UE to perform a mode transition or a state transition. After the UE has a received transition indicator, the CQI report and downlink transmission 304 of new mode between the UE and the BS begins.

In the above-mentioned process, 301, 302 and 303 are all radio resource control signaling, and CQI report in 304 is physical layer signaling.

The downlink localized transmission mode described refers to the CQI report method of the UE in this mode, which is a localized CQI report, namely reporting the CQI of several sub-frequency bands, and although it is suitable to transmit data in localized resource, the description herein does not exclude the BS from allocating a data transmission to some distributed resource in some sub-frames, even though the UE transmits the localized CQI report in the transmission process of this mode. In the same way, the described downlink distributed transmission mode refers to the CQI report transmitted by the UE is unitary in the frequency band, which is suitable for transmission in a distributed resource. However, in the same way, does not exclude, in the transmission process of the mode, although the UE transmits distributed CQI report, the BS from allocating data transmission to some localized resource in some sub-frames.

There are two processes of transitioning a downlink transmission between a localized data transmission and a distributed data transmission. One process transitions from a distributed transmission to a localized transmission; the other process transitions from a localized transmission to a distributed transmission.

Figure 4:
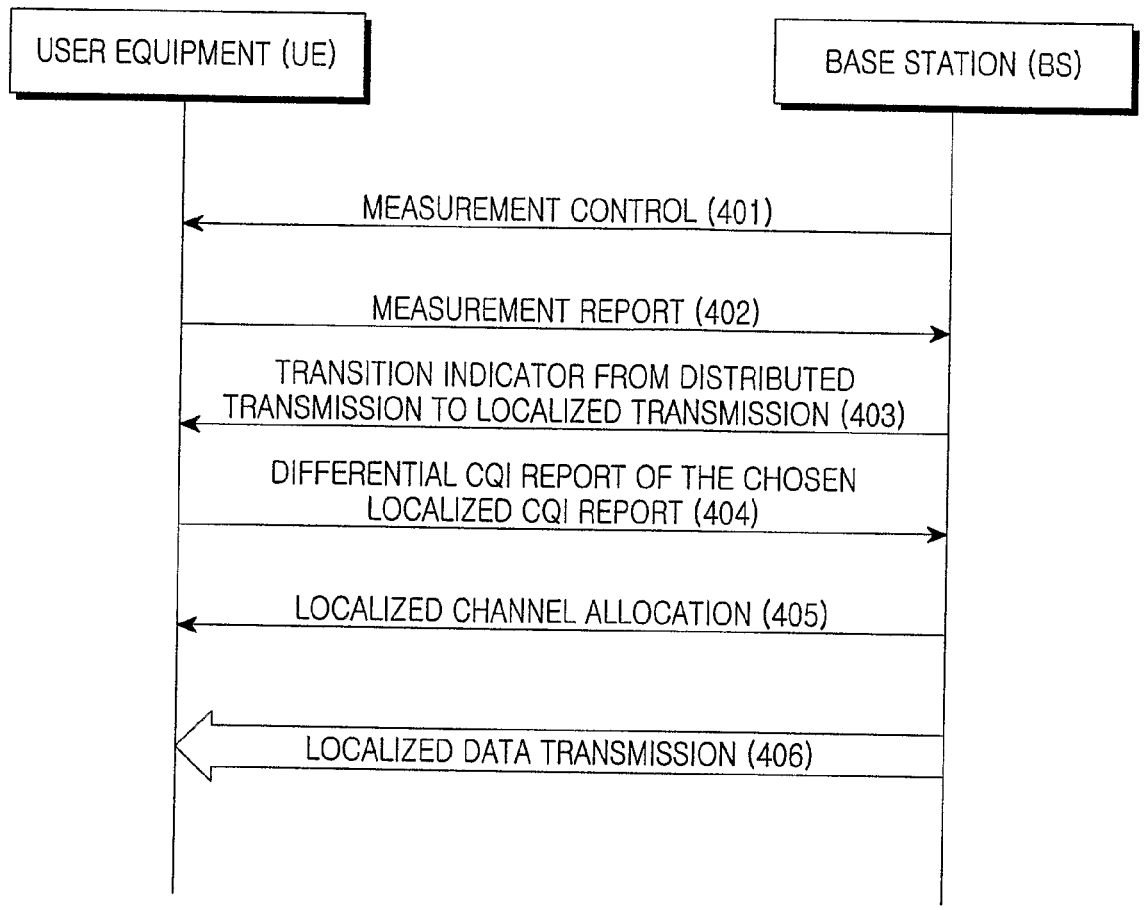
FIG. 4 is a signaling flowchart of a process of transitioning from a distributed transmission to a localized transmission according to the present invention.

A process of transitioning from a distributed transmission to a localized transmission according to the present invention, as shown in the signaling flowchart of FIG. 4, is described as follows:

The BS monitors a change in the time domain of the UE's uplink transmission channel quality. If the change is slow, the BS will transmit measurement control signaling 401 to the UE, instructing the UE to report a measurement report that reflects a frequency domain selective fading degree in a downlink channel and the UE's report condition.

When the BS indicates the measurement report condition, the BS can indicate a measurement report threshold or a period of UE reporting measurement report to the UE. After the UE has received the measurement control signaling, the UE will begin to measure frequency domain selectivity in the UE's downlink channel, and when the report condition is satisfied, the UE will transmit the measurement report 402 to report the measured fading's selectivity value in the frequency domain in the downlink channel or report an event that reflects a fading's frequency domain selectivity change in the downlink channel to the BS. After the BS has received the frequency domain selectivity report or the event report from the UE, the BS will determine whether to convert the UE's downlink transmission from distributed transmission to localized transmission based on the degree of change in the UE's fading's frequency domain selectivity or the received event report. If the frequency selectively report in the measurement report does not meet a threshold, the downlink transmission has changed from a localized to a distributed transmission. If it does, then the BS will transmit to the UE a transition indicator 403 from distributed transmission to localized transmission.

After the UE has received a transition indicator 403, the UE will begin to transmit to the BS a localized CQI report 404 and transmit a CQI report of several CQI report frequency sub-bands to the BS. After the BS has received the localized CQI report, the BS will perform channel allocation for the UE based on CQIs of various CQI report sub-frequency bands, and transmit, to the UE, localized channel allocation signaling 405, indicating which frequency sub-bands are used to transmit data to the UE. Afterwards, the BS will transmit, to the UE, a localized data transmission 406.

Figure 5:
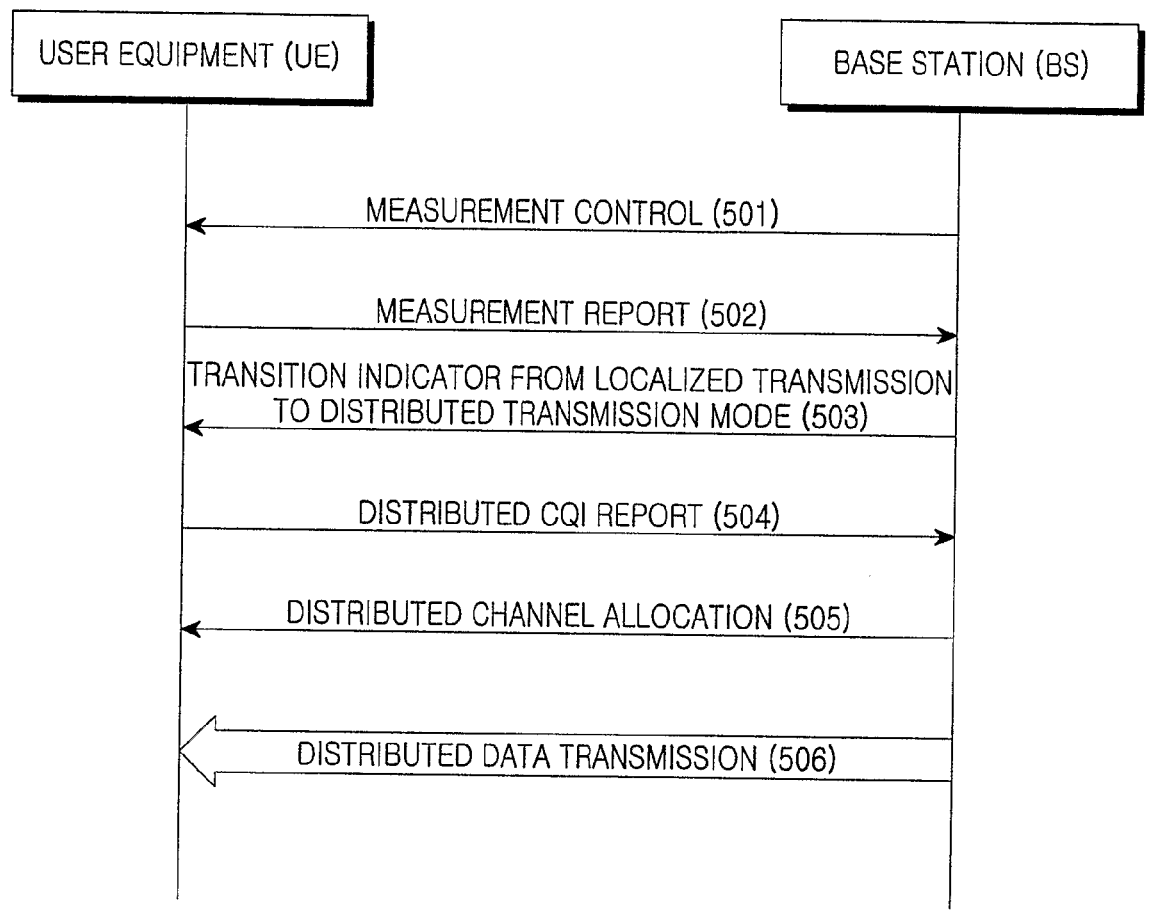
FIG. 5 is a signaling flowchart of a process of transitioning from a localized transmission to a distributed transmission according to the present invention.

FIG. 5, which is a signaling flowchart illustrating a process of transitioning from a localized transmission to a distributed transmission according to the present invention is described as follows:

The BS monitors a change in the time domain of the UE's uplink transmission channel quality. If the change is fast, namely, if the degree change in the time domain of UE's uplink channel measured by the BS satisfies an appointed condition, the BS will transmit, to the UE, a transition indicator 503 from a localized transmission to a distributed transmission. If the change is slow, the BS will continue determining whether CQIs of several CQI report sub-frequency bands sent from the UE to the BS can reflect a frequency domain selective fading degree of a downlink channel, namely whether the number of sub-frequency bands in the localized CQI report can reflect the frequency domain selective fading degree of the whole frequency band. If t the reflection occurs, then the BS will decide frequency domain selective fading degree based on the localized CQI report, and determine whether to transmit the transition indicator 503 from a localized transmission to a distributed transmission, to the UE, based on the decided frequency domain selective fading degree. But if the localized CQIs transmitted from the UE to the BS are CQIs of partial CQI report sub-frequency bands and can't be used to judge the frequency domain selective fading degree of the whole frequency band, the BS will transmit, to the UE, the measurement control signaling 501, instructing the UE to report a measurement report that reflects the frequency domain selective fading degree of the downlink channel, and the report condition of the UE. When the BS indicates the measurement report condition, the BS can indicate a measurement report threshold value to the UE, or can indicate a period of the UE reporting the measurement report. After the UE has received the measurement control signaling, the UE will begin to measure frequency domain selectivity in the UE's downlink channel. When the report condition is satisfied, the UE will transmit, to the BS, a measurement report 502 to report the UE's measured fading's selectivity value in frequency domain in downlink channel or an event that reflects the fading's frequency domain selectivity change in the downlink channel. After the BS has received the frequency domain selective report or the event report from the UE, the BS will determine whether to convert the UE's downlink transmission from a localized transmission to a distributed transmission based on the UE's fading's frequency domain selectivity change degree or the reported event. If the BS performs the conversion, then the BS will transmit, to the UE, a transition indicator 503 from a localized transmission to a distributed transmission.

After the UE has received the transition indicator 503, the UE will transmit, to the BS, a distributed CQI report 504 and transmit, to the BS, a mean CQI report of the whole frequency band. After the BS has received the distributed CQI report, the BS will allocate a channel for the UE based on the reported CQI value, and transmit, to the UE, a distributed channel allocation signaling 505, indicating which distributed sub-frequency bands are used to transmit data to the UE. Afterwards, the BS will transmit, to the UE, a distributed data transmission 506.

Figure 6:
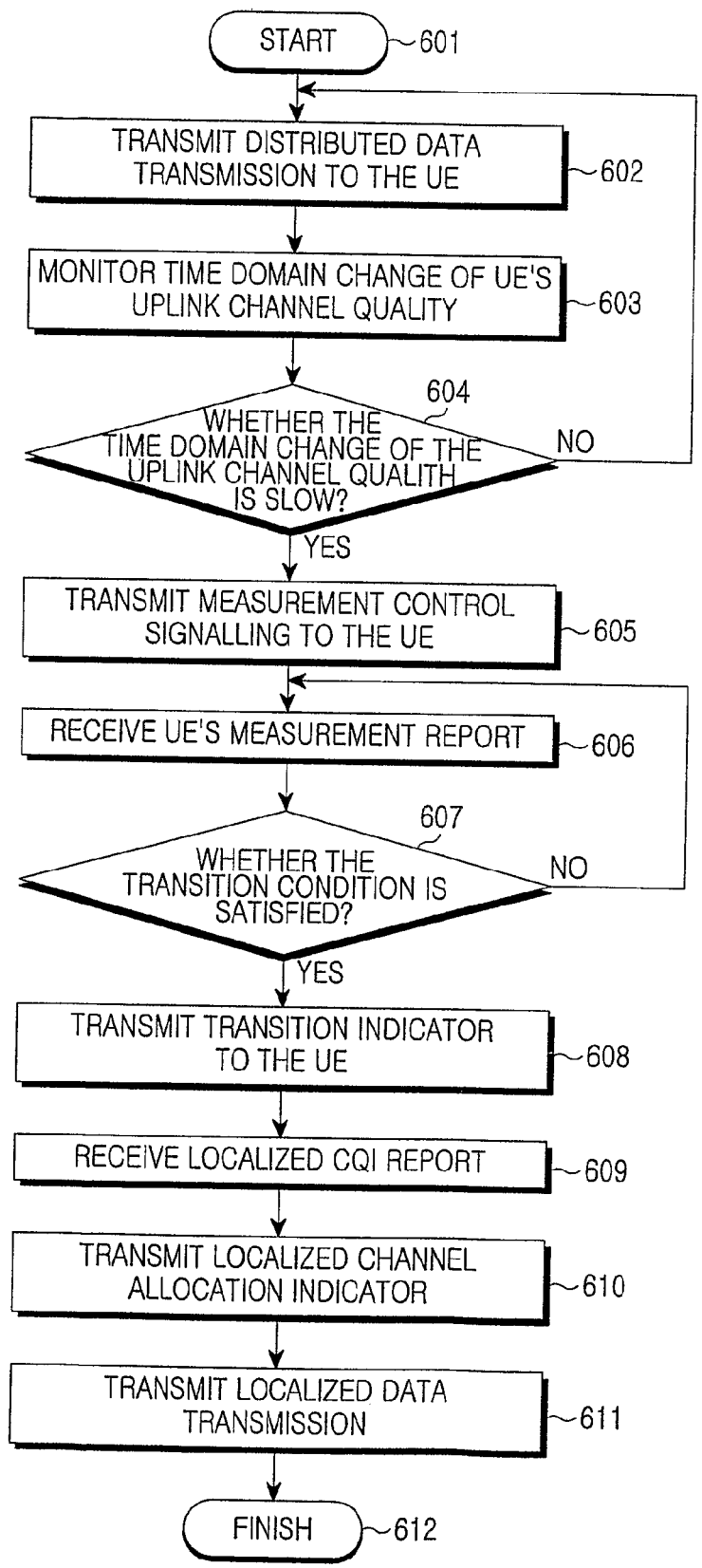
FIG. 6 is an operation flowchart of a BS process of transitioning from a distributed transmission to a localized transmission according to the present invention.

FIG. 6 is an operation flowchart of a BS process of transitioning from a distributed transmission to a localized transmission according to the present invention. When the BS transmits a distributed data transmission 602 to the UE, the BS will monitor the change in time domain of UE's uplink channel quality, at step 603, and then determine whether the change of time domain of the UE's uplink channel is slow, at step 604. If the change is not slow, the BS continues with distributed transmission and monitoring. If is the change is slow, the BS will transmit measurement control signaling, at step 605, indicating the UE to report measurement report that reflects frequency domain selective fading degree of downlink channel and its report condition. When the BS indicates measurement report condition, the BS can indicate a measurement report threshold value to the UE, or can indicate a period of the UE's measurement report. Then the BS begins to receive the measurement report that reflects the frequency domain selective fading degree of the downlink channel or an event that reflects a changing degree, transmitted by the UE, at step 606. At step 607, the BS determines whether the transition condition from distributed transmission to localized transmission is satisfied, if the transition condition isn't satisfied, the BS continues to receive, at step 606, a measurement report, if the transition condition is not satisfied, then the BS transmits, to the UE, at step 608, a transition indicator from a distributed transmission to a localized transmission. Afterwards, the BS begins to receive a localized CQI report, at step 609, sent from the UE. Then the BS allocates a channel for the UE based on the reported CQI values of various frequency bands, and transmits, to the UE, localized channel allocation indicator, at step 610. Then, the BS can transmit a localized data transmission in the allocated channel, at step 611, to complete the transmission mode transition process.

Figure 7:
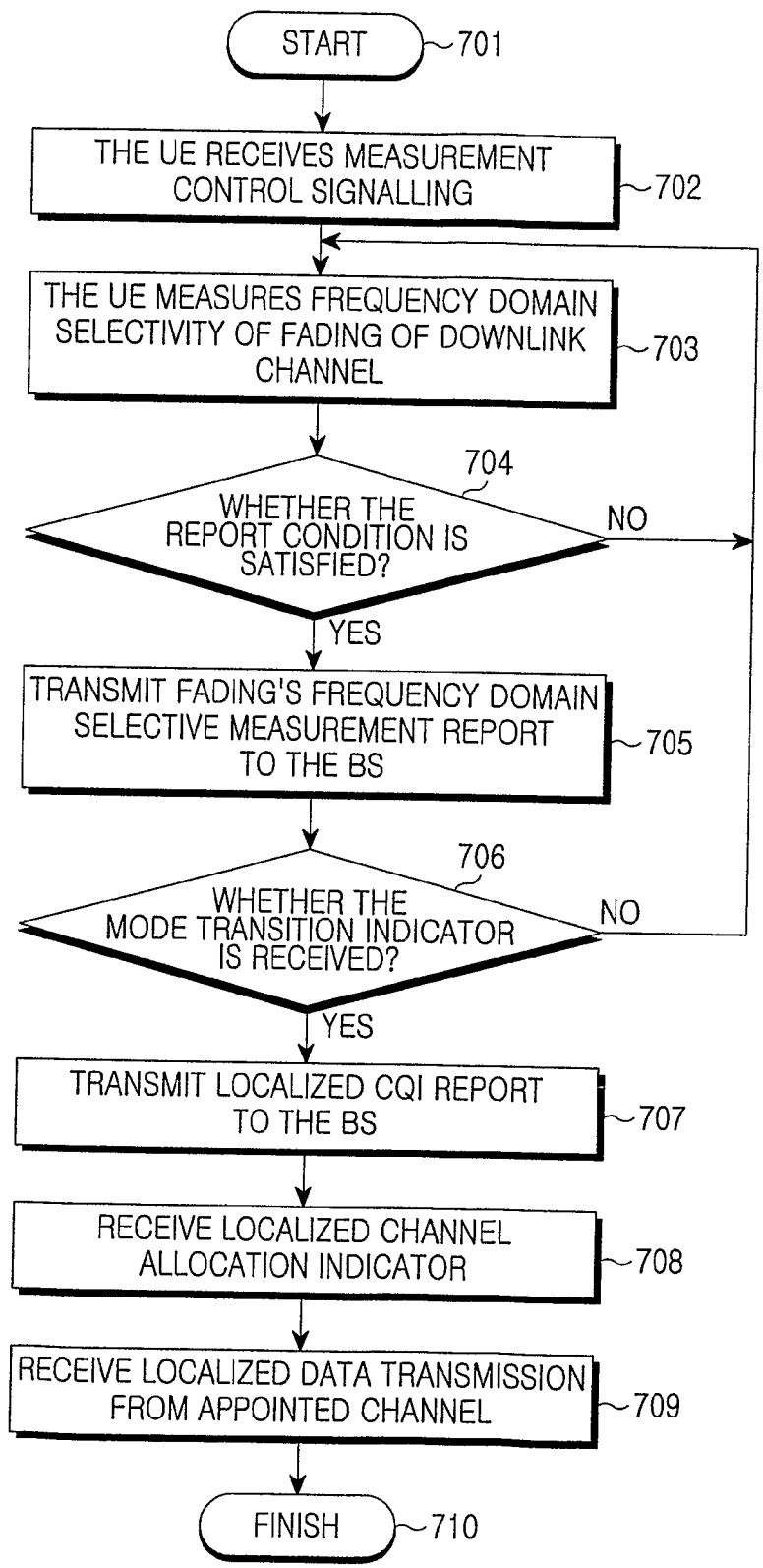
FIG. 7 is an operation flowchart of UE process of transitioning from a distributed transmission to a localized transmission according to the present invention.

FIG. 7 is an operation flowchart of UE process of transitioning from a distributed transmission to a localized transmission according to the present invention. When the UE receives measurement control signaling, at step 702, instructing the UE to report a frequency domain selectivity measurement report of downlink channel fading and a report condition, the UE begins to make corresponding measurement, at step 703. Then the UE determines, at step 704, whether the report condition is satisfied. If the report condition is not satisfied, the UE continues measurement and judgment. If is the report condition is satisfied, then the UE transmits, at step 705, a fading's frequency domain selectivity measurement report or transmit an event that reflects frequency domain selectivity change to the BS. Afterwards, at step 706, the UE monitors whether the UE has received a mode transition instruction from a distributed transmission to a localized transmission sent from the BS. If the UE has not received the mode transition instruction, the UE continues measuring and reporting. If the UE receives the mode transition instruction, then the UE will, at step 707, transmit a localized CQI report, to report CQIs of several CQI report sub-frequency bands to the BS. Then, at step 708, the UE receives localized channel allocation signaling sent from the BS. Through knowing which sub-frequency bands the BS will transmit data in, then the UE can, at step 709, receive localized a data transmission in appointed frequency bands, thus completing the transmission mode transition process.

Figure 8:
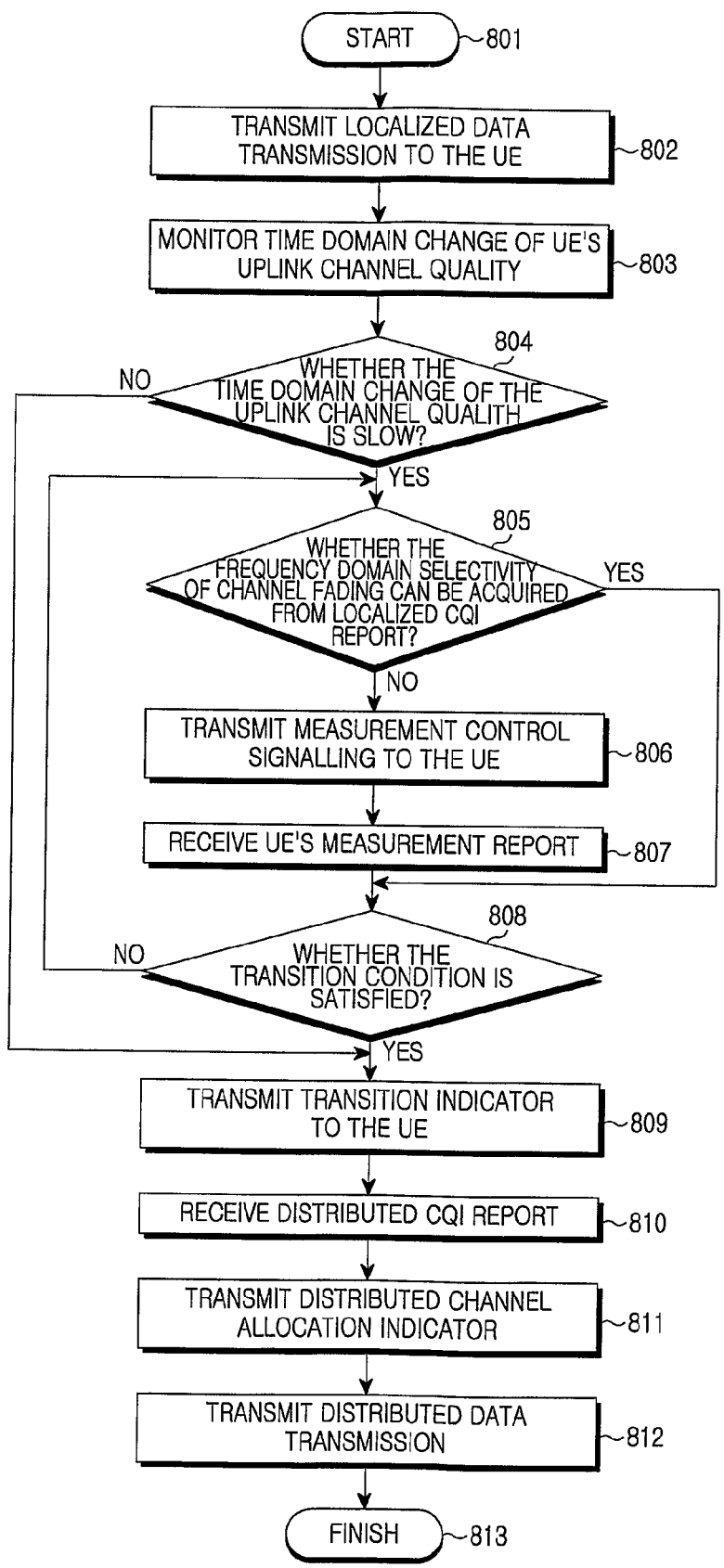
FIG. 8 is an operation flowchart of a BS process of transitioning from a localized transmission to a distributed transmission according to the present invention.

FIG. 8 is an operation flowchart of a BS process of transitioning from a localized transmission to a distributed transmission according to the present invention. In the process of transmitting, by the BS, localized data transmission, at step 802, to the UE, the BS will monitor, at step 803, a change in the time domain of the UE's uplink channel quality, and then determines, at step 804, whether the change in the time domain of the UE's uplink channel is slow. If the change is not slow, then the BS transmits, to the UE, a transition indicator, at step 809, instructing the UE to convert from a localized to a distributed transmission. If is the change is slow, the BS will continue determining whether the BS can determine a fading's frequency domain selectivity based on a current CQI report of a localized transmission, at step 805. If the BS can perform such a determination, the BS determines whether the condition to convert from a localized transmission to a distributed transmission is satisfied, based on channel fading's frequency domain selectivity, at step 808. If the determination cannot be performed, then the BS will transmit measurement control signaling to the UE, at step 806, instructing the UE to report a downlink channel fading's frequency domain selectivity measurement report and a report condition. When the BS indicates the measurement report condition, the BS can indicate a measurement report threshold value to the UE and can also indicate period of UE reporting measurement report. Then he BS receives a measured value of the downlink channel fading's frequency domain selectivity sent from the UE or a measurement report of an event that reflects the downlink channel fading's frequency domain selectivity change degree, at step 807. Afterwards, the BS determines whether the condition to convert from a localized transmission to a distributed transmission is satisfied based on channel fading's frequency domain selectivity measurement report or an event report, at step 808.

If the result of the determination at step 808 is no, then the BS will continue executing step 805. If the result of the determination at step 808 is yes, the BS will transmit, to the UE, a transition indicator 809, instructing the UE to convert from a localized transmission mode to a distributed transmission mode. Then, the BS will receive distributed a CQI report transmitted from the UE, at step 810, and transmit, to the UE, a channel allocation indicator of a distributed transmission based on the reported CQIs, at step 811. Finally the BS will transmit a distributed transmission to the UE in indicated channels, at step 812, thus completing the transition from the localized transmission mode to the distributed transmission mode.

Figure 9:
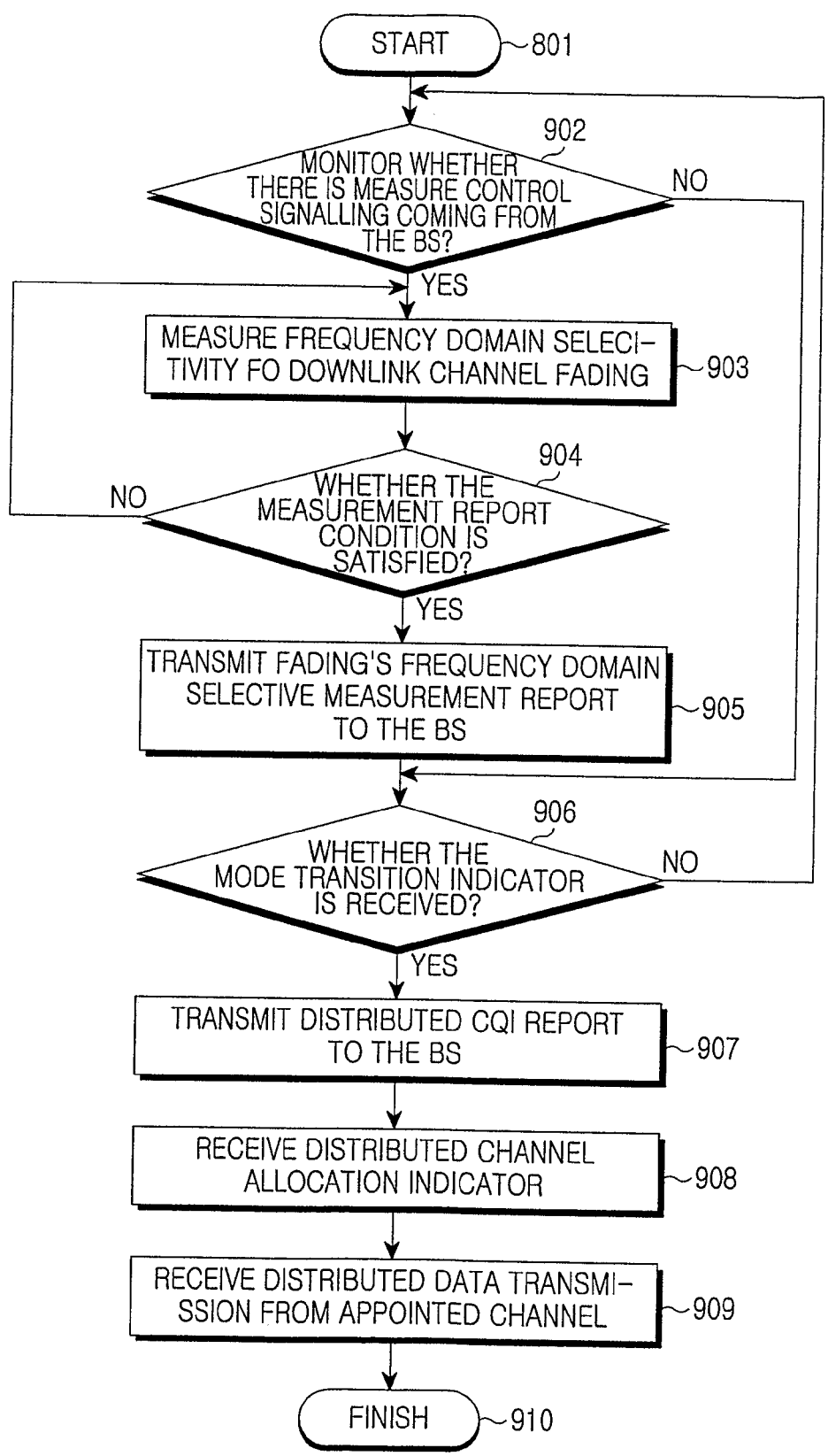
FIG. 9 is an operation flowchart of a UE process of transitioning from a localized transmission to a distributed transmission according to the present invention.

FIG. 9 is an operation flowchart of a UE process of transitioning from a localized transmission to a distributed transmission according to the present invention. When the UE performs a localized transmission, the UE monitors whether there is measurement control signaling coming from the BS, at step 902, and judges whether the BS requires the UE to report a measurement report of downlink channel fading frequency domain selectivity. If the BS does not require such information, then the UE will continue monitoring whether there is a transmission mode transition indicator from the BS, at step 906. If there is a request from the BS at step 902, then the will, at step 903, measure the downlink channel fading's frequency domain selectivity. Afterwards the UE determines, at step 904, whether the report condition is satisfied. If the report condition is not satisfied, then the UE continues executing step 903. If the reporting condition is satisfied, then, at step 905, the UE transmits, to the BS, a downlink channel fading's frequency domain selectivity measurement report or an event report that reflects the fading's selectivity changing degree in frequency domain. Afterwards, the UE, at step 906, determines whether there is a transmission mode transition indicator coming from the BS.

At step 906, if the result of the determination is no, i.e. an indicator has not been received, then the UE will perform step 902, and if the result of the determination is yes, then, the UE will transmit, to the BS, a distributed CQI report, at step 907, and then receive a distributed channel allocation indicator, sent from the BS, at step 908. Finally, the UE can receive a distributed transmission, sent from the BS, in the allocated distributed channel, at step 909, thus completing the transition from a localized transmission to a distributed transmission.

To more clearly illustrate the method of the present invention, an implementation example is given as follows:

A transition example from a distributed transmission to a localized transmission is given first:

Suppose the UE's current downlink data transmission is a distributed transmission, and the UE is moving at a low speed, the change in time domain of the UE's channel is slow. During the transmission, the BS will monitor a change in the time domain of the UE's uplink transmission channel quality. A feasible method of monitoring is that the BS measures variance of SNRs in uplink transmission sub-carriers. If during a period of time, the measured variance of SNRs is lower than an appointed threshold, then the BS can determine that the change in the time domain of the UE's channel is slow, and therefore, the UE is moving at a low speed. In such a channel condition, a localized transmission may be the suitable downlink transmission mode for the UE.

However, as for flat fading channel, a distributed transmission can acquire the same transmission gain as localized transmission, and the corresponding uplink report CQI signaling load is relatively light. Therefore, in a flat fading channel, a distributed transmission is the optimal transmission method. Therefore a further determination must be performed based on the UE's downlink channel fading's frequency domain selectivity. Therefore, the BS transmits, to the UE, measurement control signaling, requiring the UE to report downlink channel fading's frequency domain selectivity measurement report. In the mean time, when the BS requires the UE to report the measurement report, the UE can also provide the corresponding measurement report condition to the BS. For example, the UE provides the threshold of the measurement report, when the measured value is larger than the threshold, the UE will transmit, to the BS, the measurement report and an event report, indicating comparison result of the measured value and threshold; or the UE can provide an appointed report period, e.g., the BS gives the report period of 10 ms. Then the UE will transmit the measurement report to the BS every 10 ms to report the measured value.

After the UE has received the measurement control signaling to require the UE to report the downlink channel fading's frequency domain selectivity measurement, the UE will begin to take such a measurement. The implementation example demonstrates that the measured value that describes the downlink channel fading's selectivity in frequency domain is the maximum CQI difference CQI_difference_max of various CQI report sub-frequency bands, namely the difference of the maximum CQI subtracting the minimum CQI of all CQI report sub-frequency bands. Therefore, the UE can measure SNRs of all CQI report sub-frequency bands, and determine CQI values of all sub-frequency bands based on this measurement, and calculate a CQI_difference_max value to be reported. Then, the UE will refer to a measurement report condition given by the BS. In the implementation example, measurement report condition is used to determine whether the measured CQI_difference_max value is larger than a report threshold indicated by the BS.

When the report condition is satisfied, the UE will transmit an event report to the BS, notifying the BS that the measured CQI_difference_max value has exceeded the report threshold indicated by the BS, which illustrates that there is a relatively large frequency domain selective fading in downlink channel, using localized transmission that will acquire a relatively large scheduling gain. In this way, the BS will provide a report, to the UE, indicating signaling to convert from a distributed transmission to a localized transmission based on this event.

After the UE has received transition indicator signaling, the will transmit, to the BS, a localized CQI report, to report CQI values of several sub-frequency bands. The BS will then allocate a localized channel for the UE based on localized CQIs reported by the UE. Afterwards, the BS will perform a localized transmission in these localized channels, thus completing process of mode transition from a distributed transmission to a localized transmission.

An example of a transition from a localized transmission to a distributed transmission is described as follows:

Suppose a current UE's downlink data transmission is a localized transmission, and the system's total number of CQI report sub-frequency bands is 8.

The BS will first monitor a change in the time domain of the UE's uplink transmission channel quality, for example, monitoring a variance of SNRs in uplink transmission sub-carriers.

If the variance is larger than an appointed value for a period of time, then the variance indicates that the UE is moving at a high speed; therefore, the UE's appropriate transmission mode is a distributed transmission. Therefore, the BS will transmit a transition indicator, from a localized transmission to a distributed transmission, signaling directly to the UE.

If the variance is lower than an appointed value for a period of time, then the variance illustrates that the UE is moving at a low speed, and therefore, the UE's downlink channel fading's selectivity in frequency domain must be monitored sequentially.

Now the UE's localized CQI report method must be considered, if the UE's localized CQI report is whole frequency band's CQI report. Namely, when the UE reports CQI values of every CQI report frequency sub-band to the BS, then the BS no longer needs any other additional measurement report, and can directly determine a downlink channel fading's selectivity in the frequency domain based on localized CQI report directly, and determines whether to transmit a transition indicator from a localized transmission to a distributed transmission to the UE based on this.

But in current localized CQI report methods, many of which only report CQIs of several sub-frequency bands with best channel quality and based on these CQI reports of these sub-frequency bands, it is often difficult for the BS to determine the frequency domain selective fading degree of the whole frequency band. Suppose in the implementation example, the UE only reports three sub-frequency bands with best channel quality out of the eight sub-frequency bands. Then, in order to acquire the downlink channel fading's frequency domain selectivity, the BS requires a measurement report that reflects downlink channel fading from the UE. At this time, the BS will transmit measurement control signaling to the UE, indicating a report threshold of CQI_difference_max and reporting a maximum report CQI difference CQI_difference_max of CQI report sub-frequency bands and an event report of the indicated report threshold comparison result. After the UE has received this indication, the UE will measure CQI values of all sub-frequency bands, calculate CQI_difference_max, and transmit a corresponding event report to the BS, when the UE finds that the CQI_difference_max is lower than report threshold. After the BS has received an event report, the BS determines that the frequency domain selective fading in downlink channel is relatively small and that the channel is a nearly flat fading channel. Therefore, distributed transmission mode is more appropriate, and the BS will transmit a mode transition indicator from a localized transmission to a distributed transmission to the UE. After the UE has received this mode transition indicator, the will transmit a distributed CQI report to the BS, and the BS will allocate a distributed transmission channel for the UE based on the distributed CQI report sent from the UE, and, afterwards, the BS will perform distributed transmission in the allocated distributed channel, thus completing the mode transition process from a localized transmission to a distributed transmission.

While the invention has been shown and described with reference to the preferred embodiments thereof, it will be understood by those skilled in the art that various changes in form and details may be made therein without departing from the spirit and scope of the invention as defined by the appended claims.

What is claimed is:

1. A method of transitioning between a distributed transmission mode and a localized transmission mode, the method comprising the steps of:
   transmitting, by a Base Station (BS), a measurement control message to a User Equipment (UE);
   performing, by the UE, a measurement corresponding to the measurement control message;
   transmitting a measurement report message based on the measurement to the BS;
   transmitting, by the BS, a transition indicator message of a new mode to the UE, based on the measurement report message sent from the UE; and
   performing Channel Quality Indicator (CQI) reporting and a downlink transmission of the new mode between the UE and the BS begins,
   wherein the new mode includes one of the distributed transmission mode and the localized transmission mode, and
   wherein the measurement report message includes a value indicating downlink channel fading selectivity in a frequency domain, which satisfies a threshold indicated by the BS to the UE.

2. The method according to claim 1, wherein the distributed transmission mode reports a single CQI of an entire frequency band to the BS for the UE.

3. The method according to claim 1, wherein the localized transmission mode reports several CQIs of several sub-frequency bands to the BS for the UE.

4. The method according to claim 1, wherein the measurement control message includes a report condition to be measured by the UE.

5. The method according to claim 1, wherein the measurement control message includes the threshold indicated by the BS to the UE.

6. The method according to claim 1, wherein the measurement control message includes a period of measurement report indicated by the BS to the UE.

7. The method according to claim 1, wherein the measurement report message further includes an event type.

8. The method according to claim 7, wherein the event type indicates a comparison result of the value indicating the downlink channel fading selectivity and a threshold indicated by the BS.

* * * * *